(12) United States Patent
De Leo

(10) Patent No.: US 8,013,261 B2
(45) Date of Patent: Sep. 6, 2011

(54) METHOD AND DEVICE FOR DETERMINING THE MASS OF POSTAL ARTICLES TRANSFERRED IN SUCCESSION ALONG A PATH

(75) Inventor: Guido Teodoro De Leo, Genoa (IT)

(73) Assignee: Elsag Datamat SpA, Genoa (IT)

( * ) Notice: Subject to any disclaimer, the term of this patent is extended or adjusted under 35 U.S.C. 154(b) by 268 days.

(21) Appl. No.: 12/200,498

(22) Filed: Aug. 28, 2008

(65) Prior Publication Data
US 2009/0183926 A1 Jul. 23, 2009

(30) Foreign Application Priority Data

Aug. 29, 2007 (IT) ............... TO2007A0612

(51) Int. Cl.
*G01G 9/00* (2006.01)
*G01G 19/413* (2006.01)
(52) U.S. Cl. ............... 177/1; 177/25.15; 705/407
(58) Field of Classification Search ............. 177/1, 25, 177/15, 185, 25.15, 145; 705/407
See application file for complete search history.

(56) References Cited

U.S. PATENT DOCUMENTS

| | | | | |
|---|---|---|---|---|
| 3,643,753 A * | 2/1972 | Godwin et al. | | 177/185 |
| 3,805,904 A * | 4/1974 | Zimmerer | | 177/54 |
| 3,857,488 A * | 12/1974 | Le Cren | | 209/593 |
| 4,379,495 A * | 4/1983 | Cocks et al. | | 177/1 |
| 4,696,358 A * | 9/1987 | Doerman et al. | | 177/145 |
| 4,709,770 A * | 12/1987 | Kohashi et al. | | 177/50 |
| 4,817,026 A * | 3/1989 | Inoue et al. | | 708/300 |
| 5,130,938 A * | 7/1992 | Inoue | | 702/194 |
| 5,594,184 A * | 1/1997 | Schroder et al. | | 73/865 |
| 5,689,092 A * | 11/1997 | Wurz et al. | | 177/145 |
| 5,723,825 A * | 3/1998 | Dolan et al. | | 177/145 |
| 5,900,590 A * | 5/1999 | Solberg et al. | | 177/1 |
| 6,107,579 A * | 8/2000 | Kinnemann | | 177/145 |
| 6,940,025 B1 * | 9/2005 | Salomon | | 177/25.15 |
| 7,096,152 B1 * | 8/2006 | Ong | | 702/173 |
| 7,141,745 B1 * | 11/2006 | Schoon et al. | | 177/25.15 |
| 7,247,801 B2 * | 7/2007 | Salazar et al. | | 177/1 |
| 7,297,879 B2 * | 11/2007 | Salomon | | 177/1 |
| 7,687,727 B2 * | 3/2010 | Turner | | 177/1 |
| 2006/0237237 A1 * | 10/2006 | Kerschbaum et al. | | 177/145 |

OTHER PUBLICATIONS

"Digital Control System Analysis and Design", Charles Phillips et al., Prentice-Hall, Inc. Englewood Cliffs, N.J., © 1984, pp. 78-79 & 428-429.*

* cited by examiner

Primary Examiner — Randy W Gibson
(74) Attorney, Agent, or Firm — Berenato & White, LLC

(57) ABSTRACT

Method and device for determining the mass of postal articles transferred in succession; according to the method, the postal articles are transferred along a path having a change of direction, which entails an acceleration on the postal articles; at least one quantity is measured indicating of the force of reaction to the inertia of the postal articles associated to said acceleration so as to determine then the mass of the postal articles.

23 Claims, 2 Drawing Sheets

METHOD AND DEVICE FOR DETERMINING THE MASS OF POSTAL ARTICLES TRANSFERRED IN SUCCESSION ALONG A PATH

The present invention relates to a method for determining the mass of postal articles transferred in succession along a path, in particular for determining the mass of letters, envelopes or postcards.

BACKGROUND OF THE INVENTION

Sorting machines are known that transfer individual letters in succession and that include weighing machines arranged along the path, in such a way as to measure the weight of the moving letters. The weight measured, for example, is used for verifying whether the rates paid are correct with respect to the physical characteristics of the letters.

The detection of the weight imposes waiting for a stabilization of the value measured by the sensors of the weighing machine during the passage of each letter, before reading or acquiring said value. For sorting machines that reach a rate of 50 000 letters per hour, known weighing machines do not manage to measure the weight in a precise way during the passage of the letter on the weighing machine in so far as the time interval of passage available for the measurement is so small (even $35 \cdot 10^{-3}$ s) as not to allow optimal stabilization of the value measured by the sensors of the weighing machine.

In order to manage to carry out weighing with a sufficient precision, known weighing machines have a limit capacity of approximately 18 000 letters per hour. Consequently, it is necessary to provide two weighing machines that operate in parallel to reach at least a rate of 36 000 letters per hour. The fact of using two weighing machines in parallel increases the costs of the equipment and makes it necessary to install a switch section upstream and a confluence section downstream of the weighing machines, with consequent risks of interference or bottlenecks in the flows of letters that reach the confluence section, with consequent increase also in the costs of operation. In addition, this installation occupies a significant space, in particular of approximately 10 m², due to the length of the weighing machine (2 m) times the width of the path of the letters comprising the operative spaces around the sorting line (5 m).

In addition, in known weighing machines of the type described above the tare is defined by a horizontal plate and by a conveyor that is carried by said plate and conveys the letters. Said tare significantly affects the measurement of the sensors with respect to the weight of the letter so that the sensors must have a full scale range that is very wide as compared to the effective weight of the letter that is to be determined, and, consequently, the measurement has a relatively low precision.

SUMMARY OF THE INVENTION

The aim of the present invention is to provide a method for determining the mass of postal articles transferred in succession along a path that will enable a simple and low-cost solution to the problems set forth above.

Provided according to the present invention is a method for determining the mass of postal articles transferred in succession, said method being characterized in that it comprises the steps of:

transferring the postal articles in line along a path, which comprises a change of direction that entails an acceleration on each said postal article;

measuring at least one quantity indicating the force of reaction to the inertia of said postal articles associated to said acceleration; and determining the mass or the weight of said postal article as a function of the measurement of said quantity.

The present invention moreover relates to a device for determining the mass of postal articles transferred in succession along a path according to the method and comprising:

a support;

conveyor means carried by said support for transferring said postal articles in succession; and at least one sensor;

characterized in that said conveyor means define, along said path, a change of direction that entails an acceleration on each said postal article; and in that said sensor is arranged in a position such as to measure at least one quantity indicating the force of reaction to the inertia of said postal articles associated to said acceleration.

BRIEF DESCRIPTION OF THE DRAWINGS

The invention will now be described with reference to the annexed drawings, which illustrate a non-limiting example of embodiment thereof and in which.

DETAILED DESCRIPTION OF THE INVENTION

Figure 1:
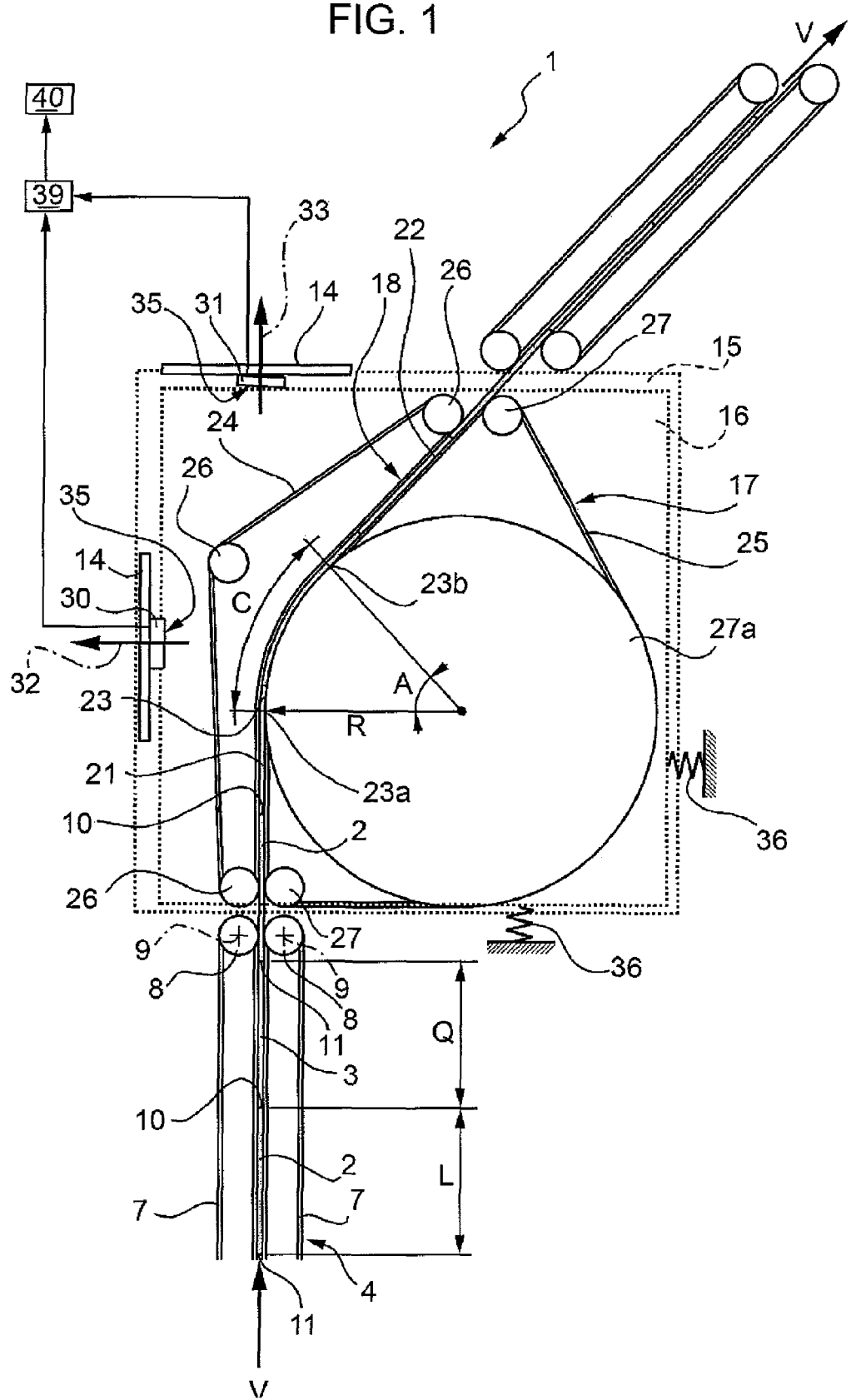
FIG. 1 is a schematic illustration in top plan view of a preferred embodiment of the method for determining the mass of postal articles transferred in succession along a path, according to the present invention.

In FIG. 1, designated by 1 is a device (illustrated schematically) for determining the mass of postal articles 2, for example letters, which are transferred in succession along a pre-defined path 3 via a set 4 of motor-driven conveyors, of the type comprising belts 7 wound over pulleys or rollers 8 having a vertical axis 9. The path 3 is horizontal and is defined by pairs of conveyors facing one another in such a way as to withhold the letters 2 firmly together and convey them, the letters consequently remaining in a vertical position whilst they are transferred in line. In other words, the bottom edge of the letters 2 remains resting on a horizontal supporting surface while the letters are transferred, whilst the front edge 10, facing in the direction of advance of the flow, and the rear edge 11, facing in the opposite direction, are vertical.

The device 1 is arranged along the path 3 and comprises a fixed support defined by a frame 14 and by a horizontal plate 15 carried by the frame 14. The device 1 then comprises a mobile support defined by a horizontal plate 16, which is set on top of the plate 15, and is coupled to the plate 15 so as to float horizontally with negligible friction and thus define an inertial plate. In the solution of FIG. 1, the plate 16 is mobile in any direction along a plane parallel to the path 3, i.e., it has two degrees of freedom; for example, an intermediate frame (not illustrated) is provided, which is coupled to the plates 15 and 16 via respective guides orthogonal to one another and comprising ball bearings or else recirculating-ball bearings. Alternatively, a layer of pressurized air could be provided or else a plurality of air balloons between the plates 15 and 16.

The device 1 comprises a conveyor 17, which forms part of the set 4, is located on top of the plate 16 and is independent of the fixed support. Between the plate 16 and the frame 14 there is envisaged only transfer of the electrical supply and of possible signals via wiring, without any significant exchange of forces, for example due, either directly or indirectly, to the transfer of driving power and to the elasticity of the belts of the conveyor 17.

The conveyor 17 defines a stretch 18 of path, which is constituted by a rectilinear input branch 21, a rectilinear output branch 22, and a curve 23 shaped like the arc of a circumference, which radiuses the branches 21 and 22 to one another.

The conveyor 17 comprises two endless belts 24, 25, which withhold the letters 2 together, while they draw them in succession, and are wound over pulleys or rollers 26 and 27, respectively, coupled to the plate 16 so as to be able to rotate about vertical axes thereof. One of the pulleys 27 is designated by the reference number 27a and substantially defines the radius of curvature R of the curve 23 (neglecting the thickness of the belt 25 and of the letters 2). For example, the radius of curvature R is approximately 0.15 m.

An electric motor (not illustrated) is carried by the plate 16 in a fixed position and, with appropriate control and transmission mechanisms, starts the pulley 27a and keeps it in rotation. Preferably, the motor is set underneath of the plate 16, and the plate 15 has a through opening (not illustrated) traversed with play by the motor.

Two load cells 30, 31 are fixed to the frame 14 in positions such as to measure thrusts exerted by the plate 16 along respective horizontal axes 32, 33 of measurement transverse to one another, preferably orthogonal to one another and aligned with the centre of gravity of the inertial system constituted by the plate 16 and the conveyor 17. The thrusts measured by the load cells 30, 31 define the components of the horizontal inertial thrust of the plate 16 against the frame 14. Said inertial thrust is defined by the centrifugal force of each letter 2 when the letter 2 follows the curve 23, i.e., to the force of reaction to the inertia exchanged between the letter 2 and the plate 16. Each load cell 30, 31 comprises a deformable member (not illustrated), which has a vertical resting surface 35, on which the plate 16 exerts its own inertial thrust. Said member undergoes bending deformation in such a way as to maintain the surface 35 always parallel to itself, and, for example, has an articulated-parallelogram structure. Preferably, the plate 16 is kept in contact against the surfaces 35 of the load cells 30, 31 via elastic positioning elements 36 (illustrated schematically), which are set between the plate 16 and the frame 14 on the opposite sides with respect to those where the load cells 30, 31 are provided.

In the flow of postal articles along the path 3, the edge 11 of each letter is set at a distance from the edge 10 of the letter 2 that follows it by a distance Q, in particular of approximately 0.096 m. In addition, the letters 2 are drawn at a constant linear speed V, for example, of approximately 3.85 m/s. Consequently, a time interval V/Q (of approximately $25 \cdot 10^{-3}$ s) elapses in correspondence of the empty space between each pair of letters.

In order to determine the mass of each letter 2 in a way distinct from the mass of the following and previous letters, the curve 23 must be occupied always and only by one letter 2 at a time. In order to meet said condition, the arc of circumference of the curve 23 must have a length C smaller than the distance Q and, hence, have an angle of curvature A (expressed in radians) smaller than the quantity Q/R: in the specific case of the radius of curvature R of 0.15 m, the angle of curvature A must be smaller than 0.64 rad, i.e., smaller than approximately 36.6°.

The load cells 30, 31 are connected to a data-acquisition system 39 (illustrated schematically), which has a relatively high acquisition rate so as to acquire a series of measurements for each letter whilst said letter follows the curve 23.

The time interval T available for acquiring said measurements is assumed as equal to the time interval of passage that elapses between two successive letters:

$$T=(Q+L)/V$$

where L is the length of the letter 2 between the edges 10 and 11. For example, with letters having a length L of 0.200 m, with a distance Q of 0.096 m, and with a speed V of 3.85 m/s, we have $$T=(0.096+0.200)/3.85 \approx 77 \cdot 10^{-3} \text{ s}.$$

With an acquisition rate, for example, of 1000 measurements per second, approximately 77 measurements are performed in the time interval T. For letters having greater lengths L, obviously the time interval T of passage and, hence, the number of measurements is greater: in particular, with an acquisition rate of 1000 Hz and a speed V of 3.85 m/s, the number of measurements for each letter is comprised between 65 and 105 according to the length L.

The system 39 is connected to a calculation and control unit 40 (illustrated schematically), which stores the data measured by the load cells 30, 31 and carries out vector calculations on each pair of data measured simultaneously.

For example, with said vector calculations, the unit 40 computes a decomposition of the forces along axes different from the axes 32, 33, and/or obtains the magnitude and the direction of the inertial thrusts generated by the portions of mass that are turning in the curve 23 in the instants when the measurements have been made.

The unit 40 then carries out statistical calculations of the values acquired and/or of the various magnitudes determined. In particular, the unit 40 carries out the vector summation (or else an approximated operation of integration applying known mathematical methods) of the inertial thrusts for all the successive measurements on the individual letter 2. In other words, the summation made by the unit 40 takes into account all the fractions of the force of reaction to the inertia that are exchanged starting from the instant when the front edge 10 of the letter enters the initial point 23a of the curve 23 up to the instant in which the rear edge 11 of the same letter leaves the final point 23b of the curve 23.

The result obtained from the summation is directly proportional to the mass of the letter 2, where the coefficient of proportionality is a function of the centrifugal acceleration $V^2/R$ (in the specific case, equal to approximately 98.8 m/s$^2$) and of the acquisition rate so that the mass of the letter can be easily calculated by the unit 40 by dividing the partial results, i.e., obtained on the fractions of force of reaction to inertia, or the result of the summation by said coefficient of proportionality. Obviously, the determination of the mass is equivalent to that of the weight, given that they are values related by the acceleration of gravity.

Alternatively, the unit 40 can determine in a more simplified way the weight of the letter 2 by choosing a significant value from among the ones available, for example the mean value, the maximum value, or the median value, with reference to the number of measurements, to represent the linear mass density. Said value is multiplied by the length L of the letter 2, which is measured through the number of non-zero measurements, and supplies a value that is approximately proportional to the weight and mass of the letter.

Figure 2:
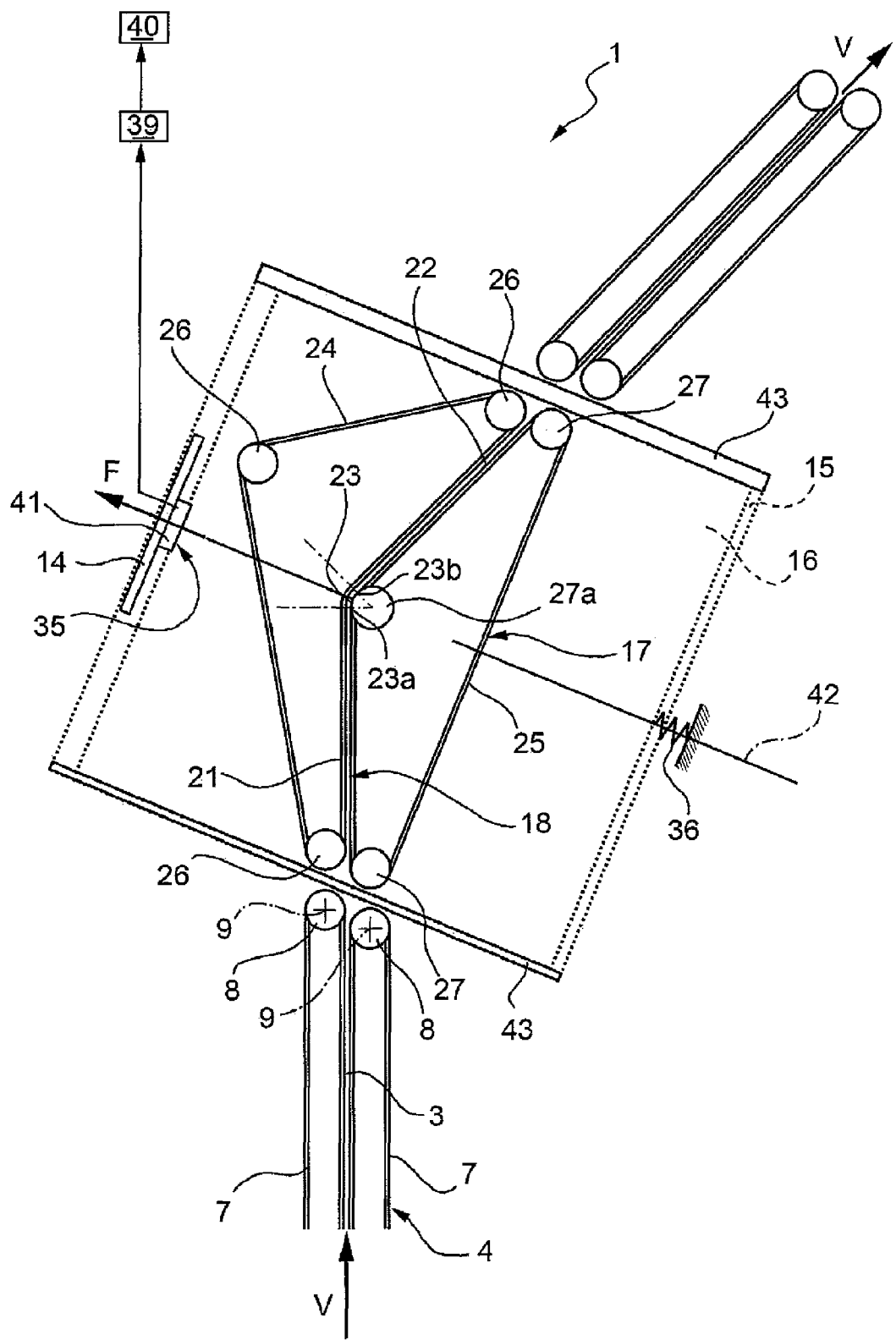
FIG. 2 is similar to FIG. 1 and shows a variant of FIG. 1.

FIG. 2 illustrates a variant of the device 1, the components of which are designated, where possible, by the same reference numbers used for the corresponding parts in FIG. 1.

According to this variant, a single load cell 41 is provided instead of the load cells 30, 31. The load cell 41 is set in a position such as to measure the inertial thrust exerted by the plate 16 with respect to the plate 15 along a rectilinear horizontal axis 42 that intersects the curve 23 and that, preferably, coincides with the bisectrix of the arc of circumference of the curve 23.

In order to obtain that the inertial floating motion of the plate 16 is directed along the axis 42, the plate 16 is coupled to the plate 15 or to the frame 14 via a rectilinear guide 43 with low coefficient of friction (illustrated schematically), for example, a guide provided with ball bearings or else bearings of the recirculating-ball type.

In addition, as compared to the solution of FIG. 1, the pulley 27a has a smaller radius: for example, it defines a radius of curvature $R=19.5 \cdot 10^{-3}$ m so as to increase the centrifugal acceleration and reduce the overall dimensions of the conveyor 17. If the angle A of the curve 23 is 30° (approximately 0.5236 rad), we have $$C = A \cdot R = 0.5236 \cdot 19.5 \cdot 10^{-3} = 10.2 \cdot 10^{-3} \text{ m};$$

$$V^2/R = (3.85)^2/(19.5 \cdot 10^{-3}) = 760.1 \text{ m/s}^2$$

The choice of a smaller radius of curvature R is aimed at increasing the amount of the acceleration of the postal articles in the change of direction, to the advantage of the intensity of the force measured by the load cell and to the advantage of the precision of determination of the mass. In this case, preferably the angle of curvature A must be greater than 15° in order to have a significant portion of letter subject to the change of direction and hence a significant increase in the force measured with respect to the weight or force of gravity, and smaller than 30°, to prevent actions of excessive bending that could cause wear or damage to the letters 2 and/or their contents.

As has already been said for the solution of FIG. 1, after acquiring a plurality of values of the thrust F via the load cell 41 via the system 39 during the passage of a letter, the unit 40 carries out statistical calculations on the acquired values. In particular, the unit 40 performs the summation (or else an approximate operation of integration applying known mathematical methods) of the plurality of values acquired and determines a result that is directly proportional to the weight of the letter, where the coefficient of proportionality is a function of the centrifugal acceleration $V^2/R$ and of the acquisition rate so that it is possible to obtain easily the weight of the letter by dividing the result of the summation by said coefficient of proportionality.

For example, when the curve 23 is completely occupied by a portion of letter, the inertial thrust F acting on the load cell 41 is $$F = (m \cdot (V^2/R))$$

where m is the mass of the portion of letter that engages the curve 23. Considering a letter having a uniform density or distribution D of the mass over the length, of, for example, 0.100 kg/m, we have $$m = D \cdot C = 0.100 \cdot 10.2 \cdot 10^{-3} = 1.02 \cdot 10^{-3} \text{ kg}.$$

Consequently, $$F = 1.02 \cdot 10^{-3} \cdot 760.1 = 0.78 \text{ N}$$

If the letter has a length L of 0.200 m and a overall mass of 20 g, the weight is approximately 0.2 N. It is consequently evident how the thrust F measured by the load cell 41 is decidedly greater than the weight, in particular approximately 4 times as much, so that the inevitable errors inherent in the measurement of the load cell 41 and in the acquisition of the system 39 affect, as percentage, to a smaller extent the precision of the measurement as compared to a method that measures the weight directly. In other words, determining the mass via a quantity indicating the centrifugal force is more precise as compared to a direct measurement of the weight, albeit taking into account the errors inherent in determining the speed V and the radius of curvature R (that enter into play in the coefficient of proportionality mentioned above).

In addition, by computing the summation of a number of measurements, the errors of a repetitive type can be corrected via a calibration, whilst the random errors are partially cancelled out. For example, on a set of 20 measurements, the summation of measurements each equal to 0.78 N corresponds to 15.6 N, whilst the expected error for each measurement, for currently commercially available sensors, is approximately 0.007 N: the overall error is 0.007 N multiplied by the square root of the number of measurements (20) so that an error of approximately 0.03 N is obtained, corresponding to 0.2%.

A similar improvement in the precision is encountered also for the solution of FIG. 1.

As mentioned above, prior to use of the device 1, it is expedient to perform a calibration, in particular for zero setting of the thrust F measured when on the conveyor 17 no postal articles are present, by subtracting the thrust exerted by the elastic positioning elements 36 and filtering any possible background noise with a cyclic nature that might present when the conveyor 17 is in operation. In this connection, said background noise is measured via the load cells 30 and 31, or else 41, while the conveyor 17 is in a loadless running condition, i.e., it is not transferring the letters 2. The data obtained by this preliminary measurement are then used so as to identify and store any cyclic disturbance, i.e., the repetitive values of the noise of a cyclic nature, and to determine a filter that will enable the unit 40 to cancel out, for example by subtraction, said cyclic disturbance from the measurements that will then be made during transfer of the letters 2. More sophisticated methods can be adopted by the unit 40 taken from amongst the known available methods for stochastic estimation and analysis.

From what has been set forth above, it emerges clearly how the inertial thrusts F measured by the load cells 30, 31, 41 can prove to be of an amount greater than the weight that gravity exerts on each letter, to the advantage of the precision of the measurement.

In addition, the mass of the plate 16 and of the conveyor 17 does not enter into the measurement made by the device 1 in so far as the inertial thrust measured is horizontal. Consequently, it is possible to choose load cells having a relatively contained full scale, with further advantages as regards the precision and speed of stabilization of the measurement.

In addition, the paths of some letter-sorting machines already present curves so that it is sufficient only to replace one of said curves with the device 1 in order to update the machine itself.

The mass, or the weight, determined via the device 1 can be used not only for a check of the correctness of the rates paid according to the physical characteristics of the letters, but also for checks on the flow of letters, to check whether the letters have been damaged or their contents have been removed.

In addition, the solution presented is able to determine precisely the weight of each letter in the time available during passage. In fact, the operation of integration of the values of the thrust F measured and acquired during the passage of each letter is reliable and precise. Thanks to the characteristics set forth above, a single device 1 is sufficient to achieve the high rates of sorting machine. In this way, it is not necessary to install any switch section or any confluence section, with consequent reduction of the investment and running costs and with consequent reduction in the overall dimensions.

Thanks to the plurality of measurements made for each letter, it is then possible to identify the mass density along the length of the letter and identify letters having a thickness and/or load distributed in a non-homogeneous way that might undergo crumpling or jamming along the path 3. In particular, a letter the content of which is concentrated towards the rear edge 11 is liable to crumpling in the stopping phase at output from the sorting machine.

In particular, the solution with two sensors of FIG. 1, albeit more complex, enables acquisition of a greater amount of information and is particularly suitable and precise for said identification in so far as it takes into account two components of the force of inertia. In addition, with said solution, the integral of the component of the force of reaction to inertia in a direction orthogonal to the bisectrix of the curve 23, which theoretically should have a result close to zero, can be used via vector and statistical calculations for determining the reliability of the individual resultant on the component in a direction aligned with said bisectrix.

Finally, from the above description it emerges clearly that modifications and variations can be made to the method and to the device 1 described, without thereby departing from the sphere of protection of the present invention.

In particular, the curve 23 could be replaced by a change of direction different from the arc of a circumference.

In addition, the plate 16 could be fixed and carry a rectilinear launching conveyor and a deviator element, for example, a belt conveyor, set only on the concave side of the path downstream of the launching conveyor to define a deviation of path and associated to a sensor that detects any impact rendered as anelastic as possible in terms of index of the force of reaction to the inertia exerted by the letters. Preferably, along the deviator element the letters are not pressed or withheld between two belts, to prevent any variation of thickness from affecting the thrust of inertia, but are guided only by the deviator element, on which they are launched by the rectilinear launching conveyor.

The invention claimed is:

1. A method for determining mass of postal articles (2) transferred in succession, comprising the steps of:
    transferring the postal articles (2) in line along a path (18) comprising a change of direction (23) so that only one of the postal articles (2) occupies the change of direction (23) at a time, the change of direction (23) bending the postal articles and entailing an acceleration on each of the postal articles;
    performing a plurality of successive measurements on each of the postal articles (2) in a time interval (T) during which at least part of each of the postal articles (2) follows the change of direction (23) such that each of the successive measurements measuring a quantity (F) indicating a force of reaction to inertia associated with the acceleration of a portion of one of the postal articles engaging the change of direction (23) of the path (18);
    determining one of the mass and a weight of the postal article (2) as a function of the successive measurements of the quantity (F).

2. The method according to claim 1, wherein one of a summation and an approximated integral of the values measured with the plurality of measurements is computed.

3. The method according to claim 1, wherein the change of direction is defined by a curve shaped like the arc of a circumference (23).

4. The method according to claim 1, wherein the determination of the mass comprises a division by a coefficient of proportionality, which is a function of the acceleration and of the rate of acquisition of the measurements.

5. The method according to claim 1, wherein one of the mean value, the maximum value and the median value of the plurality of measurements is chosen as a significant value.

6. The method according to claim 1, wherein the postal articles (2) are transferred via conveyor means (17), and in that it comprises the further steps of:
    determining a disturbance by measuring the quantity (F) whilst the conveyor means (17) are running without transferring any of the postal articles (2); and
    filtering the disturbance determined by the measurements that are made when the postal articles (2) are transferred.

7. The method according to claim 1, wherein the quantity is an inertial thrust parallel to a plane on which the path (18) lies.

8. The method according to claim 7, wherein the plane is horizontal.

9. The method according to claim 7, wherein the inertial thrust (F) is measured along a single axis of measurement (42) that, projected on said plane, intersects the change of direction (23).

10. The method according to claim 9, characterized in that said axis of measurement (42), projected on the plane, coincides with the bisectrix of an angle defined between initial and final points of the change of direction.

11. The method according to claim 7, wherein two components of the inertial thrust (F) of each of the postal articles are measured along respective axes of measurement (32, 33) transverse to one another, and the vector sum of the components is computed.

12. The method according to claim 1, wherein any damage to said postal articles or removal of the content thereof can be checked on the basis of said mass with respect to values previously measured or stored.

13. The method according to claim 1, wherein an irregular distribution of mass along the length of each of the postal articles is detected.

14. A device (1) for determining mass of postal articles (2) transferred in succession along a path (18), the device comprising:
    a fixed support (14, 15) and a mobile support (16) floating relative to the fixed support (14) along at least one axis of measurement;
    motor-driven conveyor means (17) independent of the fixed support (14, 15) and carried by the mobile support (16) for transferring the postal articles (2) in succession relative to the fixed support (14, 15) and the mobile support (16), the conveyor means (17) defining, along the path (18), a change of direction (23) entailing an acceleration on each of the postal articles; and
    at least one sensor (30, 31, 41) arranged in a position such as to measure at least one quantity (F) between the fixed support (14, 15) and the mobile support (16), the quantity (F) indicating a force of reaction to the inertia of each of the postal articles associated with the acceleration.

15. The device according to claim 14, wherein the sensor is a load cell that measures an inertial thrust parallel to a plane on which the path (18) lies.

16. The device according to claim 15, wherein the support (16) is movable in at least one direction parallel to the plane, and wherein the load cell (30, 31, 41) measures the inertial thrust of the mobile support (16) with respect to the fixed support (14, 15).

17. The device according to claim 16, wherein the load cell (30, 31, 41) is set in a position such as to measure the inertial thrust along an axis of measurement (42) that, projected on the plane, intersects the change of direction (23).

18. The device according to claim 17, characterized in that said axis of measurement (42) coincides with the bisectrix of an angle defined between an initial point and a final point of the change of direction.

19. A device for determining mass of postal articles (2) transferred in succession along a path (18), the device comprising:
- a fixed support (14, 15) and a mobile support (16) floating relative to the fixed support (14) along at least one axis of measurement;
- motor-driven conveyor means (17) independent of the fixed support (14, 15) and carried by the mobile support (16) for transferring the postal articles (2) in succession relative to the fixed support (14, 15) and the mobile support (16), the conveyor means (17) defining, along the path (18), a change of direction (23) entailing an acceleration on each of the postal articles; and
- two load cells (30, 31) arranged in positions such as to measure two components of an inertial thrust of each of the postal articles along respective axes of measurement (32, 33) transverse to one another.

20. The device according to claim 17, wherein the mobile support (16) is defined by a horizontal plate, which floats horizontally with respect to the fixed support (14, 15) and carries, on top, the conveyor means (17).

21. The device according to claim 14, wherein the conveyor means (17) comprising a pair of endless belts (24, 25) facing one another so as to hold the postal articles (2) firmly therebetween and convey them along the path (18); the pair of endless belts (24, 25) is wound over pulleys (26 and 27) coupled to the mobile support (16) so as to be able to rotate relative thereto.

22. The device according to claim 14, wherein the at least one sensor (30, 31, 41) attached to the fixed support (14, 15).

23. A device (1) for determining mass of postal articles (2) transferred in succession along a path (18) disposed in a plane, the device comprising:
- a fixed support (14, 15) and a mobile support (16) movable relative to the fixed support (14) in at least one direction parallel to the plane of the path (18);
- conveyor means (17) carried by the mobile support (16) for transferring the postal articles (2) in succession; and
- at least one sensor (30, 31, 41) fixed to the fixed support (14, 15) for measuring an inertial thrust parallel to the plane of the path (18);
- the mobile support (16) defined by a horizontal plate floating horizontally with respect to the fixed support (14, 15) and carrying, on top thereof, the conveyor means (17);
- the conveyor means (17) defining, along the path (18), a change of direction (23) entailing a centrifugal acceleration on each of the postal articles;
- the sensor (30, 31, 41) arranged in a position such as to measure at least one quantity of a force (F) between the fixed support (14, 15) and the mobile support indicating the force of reaction to the inertia of the postal articles associated with the centrifugal acceleration;
- the sensor (30, 31, 41) measuring an inertial thrust of the mobile support (16) with respect to the fixed support (14, 15).

* * * * *